(12) United States Patent
Takahashi

(10) Patent No.: US 6,381,040 B1
(45) Date of Patent: Apr. 30, 2002

(54) IMAGE READING APPARATUS HAVING A PLURALITY OF READ/WRITE ACCESSES RELATIVE TO AN IMAGE DATA MEMORY AND A METHOD THEREFORE

(75) Inventor: Yuji Takahashi, Chigasaki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/122,108

(22) Filed: Jul. 24, 1998

(30) Foreign Application Priority Data

Jul. 25, 1997 (JP) .............................................. 9-215874

(51) Int. Cl.[7] ................................................ H04N 1/04
(52) U.S. Cl. ....................... 358/474; 345/530; 711/130; 710/151
(58) Field of Search ................................ 358/474, 412, 358/486, 471, 496, 494; 345/530, 531, 545; 711/130; 710/151

(56) References Cited

U.S. PATENT DOCUMENTS

| 4,999,814 A | * | 3/1991 | Hashimoto | 365/222 |
| 5,426,733 A | * | 6/1995 | Masui | 395/166 |
| 5,745,254 A | * | 4/1998 | Satou | 358/412 |
| 5,844,858 A | * | 12/1998 | Kyung | 365/233 |
| 5,982,359 A | * | 11/1999 | Kodama | 345/197 |
| 6,108,742 A | * | 8/2000 | Jeong | 710/130 |
| 6,286,083 B1 | * | 9/2001 | Chin | 711/151 |

* cited by examiner

Primary Examiner—Jerome Grant, II
Assistant Examiner—Negussie Worku
(74) Attorney, Agent, or Firm—Oblon, Spivak, McClelland, Maier & Neustadt, P.C.

(57) ABSTRACT

An image reading apparatus and method capable of allowing a memory that stores image data to be accessed by a plurality of data control units. The image reading apparatus includes a memory and a plurality of data sources. Further, a serial-to-parallel converter converts serial image data from a first data source into parallel image data. An input buffer latches the converted data. A first write mechanism writes a set of data latched in the input buffer into the memory, and a first read mechanism reads the set of data stored in the memory. An output buffer latches the set of the data read from the memory, and a data output mechanism outputs the set of the data in the output buffer, e.g. block by block and in sequence. A second write mechanism writes data from a second data source into the memory. A second write mechanism is selectively used with the first write mechanism, and a second read mechanism reads the set of the data in the memory and transfer the data to the second data source. The second read mechanism is selectively used with the first read mechanism. The first data control controls the first write and read mechanisms and the second data control unit controls the second write and read mechanisms.

18 Claims, 8 Drawing Sheets

IMAGE READING APPARATUS HAVING A PLURALITY OF READ/WRITE ACCESSES RELATIVE TO AN IMAGE DATA MEMORY AND A METHOD THEREFORE

BACKGROUND OF THE INVENTION

1. Field of the Invention

This invention relates to a method and apparatus for image reading, and more particularly to a method and apparatus for image reading in which read/write operations are executed through a plurality of read/write accesses relative to an image data memory.

2. Discussion of the Background

Image reading apparatus have been developed, such as scanners as an example, having an image memory for storing image data obtained through an operation for reading an original image. The image memory for this purpose has been generally composed of a plurality of DRAMs (dynamic random access memories) and/or SRAMs (static random access memories).

One example of various control mechanisms, used in a background image reading apparatus, for controlling such an image memory is disclosed in Japanese Patent Publication No. 6-1448 (1994), which converts serial image data into a parallel form so as to efficiently handle an input and output of a great amount of image data relative even to DRAMs, which DRAMs are not high-speed-processing chips.

In the above-described image reading apparatus, the image memory can be accessed only when the image data read from an original image is written thereto and the stored image data of the original image is read therefrom. However, other than the above-mentioned read and write operations, the image reading apparatus does not allow a data control unit or processing mechanism thereof such as a CPU (central processing unit) to access the image memory for various purposes including for examining correctness of the image data, for changing a part or a whole of the image data, and so forth.

Therefore, at present, there is no image reading apparatus which is capable of allowing a memory that stores image data to be accessed by a plurality of data control units.

SUMMARY OF THE INVENTION

Accordingly, an object of the present invention is to provide a novel image reading apparatus which is capable of allowing a memory that stores image data to be accessed by a plurality of data control units.

Another object of the present invention is to provide a novel method for an image reading apparatus to allow a memory that stores image data to be accessed by a plurality of data control units.

A further object of the present invention is to provide a novel memory control apparatus which is capable of allowing a memory that stores image data to be accessed by a plurality of data control units.

Still another object of the present invention is to provide a novel method for a memory control apparatus to allow a memory that stores image data to be accessed by a plurality of data control units.

The present invention achieves the above and other objects by implementing a structure and method with which different data control units, such as, as examples only, a scanner control unit and a central processing unit (CPU), can both access a memory. Such accesses can also be performed simultaneously.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In describing preferred embodiments of the present invention illustrated in the figures, specific terminology is employed for the sake of clarity. However, the present invention is not intended to be limited to the specific terminology so selected, and it is to be understood that each specific element includes all technical equivalents which operate in a similar manner.

Figure 1:
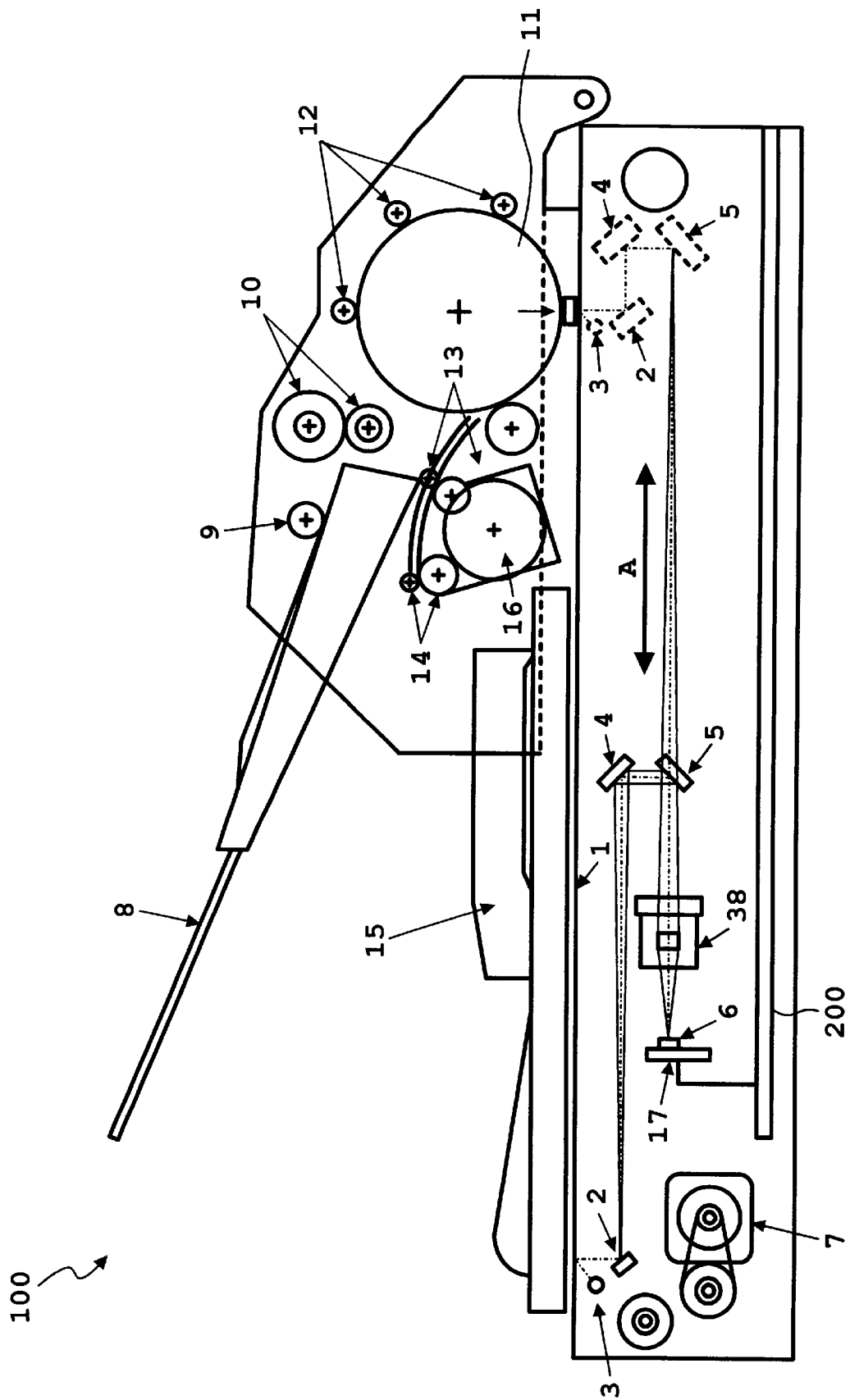
FIG. 1 is an illustration of an image reading apparatus as an exemplary embodiment according to the present invention.

Referring now to the figures, wherein like reference numerals designate identical or corresponding parts throughout the several views, and more particularly to FIG. 1 thereof, an image reading apparatus 100 as an exemplary embodiment of the present invention is illustrated. The image reading apparatus 100 of FIG. 1 includes a basic mechanism for reading an image, including a contact glass 1, a first mirror 2, a lamp 3, a second mirror 4, a third mirror 5, a CCD (charge coupled device) 6 mounted on a sensor board unit (SBU) 17, a first motor 7, and a focusing lens 38.

An original sheet (not shown) is placed on the contact glass 1 and is scanned by light through the contact glass 1 from the lamp 3. The light reflected from the original sheet impinges on the CCD 6, after being reflected by the moving mirrors 2, 4, and 5, and through the focus lens 38 that brings rays of light into focus, so as to come in focus on the CCD 6. The first mirror 2 and the lamp 3 are mounted on a first moving unit (not shown) and the second and third mirrors 4 and 5 are mounted on a second moving unit (not shown); the first and second moving units are controlled back and forth in the same direction A with a speed ratio of 2:1 by the first motor 7 during an image reading operation.

The image reading apparatus 100 of FIG. 1 further includes a mechanism that is referred to as an automatic document feeder (ADF) for automatically feeding original sheets one by one to a predetermined reading position indicated by the arrow B on the contact glass 1. The first and second moving units move to the predetermined reading position and remain positioned at the predetermined reading position during an image reading operation. The first and second moving units in dotted lines represent that these units are at such a predetermined reading position. This mechanism of the image reading apparatus 100 also includes an original sheets input tray 8, a pick-up roller 9, a pair of registration rollers 10, a feed drum 11, a plurality of feed rollers 12, a plurality of pairs of exit rollers 13 and 14, an exit tray 15, and a third motor 16.

Original sheets (not shown) are placed in a face-up position on the original sheet input tray 8 and an uppermost sheet (not shown) thereof is picked up by the pick-up roller 9 and is forwarded to the pair of registration rollers 10 that feeds the original sheet in registration with a timing of the image reading operation. The fed original sheet is then transferred to the reading position, wherein an image of the sheet is exposed to light from the lamp 3. After being read at the reading position, the original sheet is further forwarded by rollers 13 and 14 and is output to the exit tray 15. The reading light reflected from the original sheet impinges on the CCD 6, after being reflected by the moving mirrors 2, 4, and 5, and through the focus lens 38 that brings rays of light into focus, so as to come in focus on the CCD 6.

In the ADF, the pick-up roller 9 and the registration roller 10 are driven by a second motor (not shown), and the rollers 11–14 are driven by a third motor 16.

Figure 2:
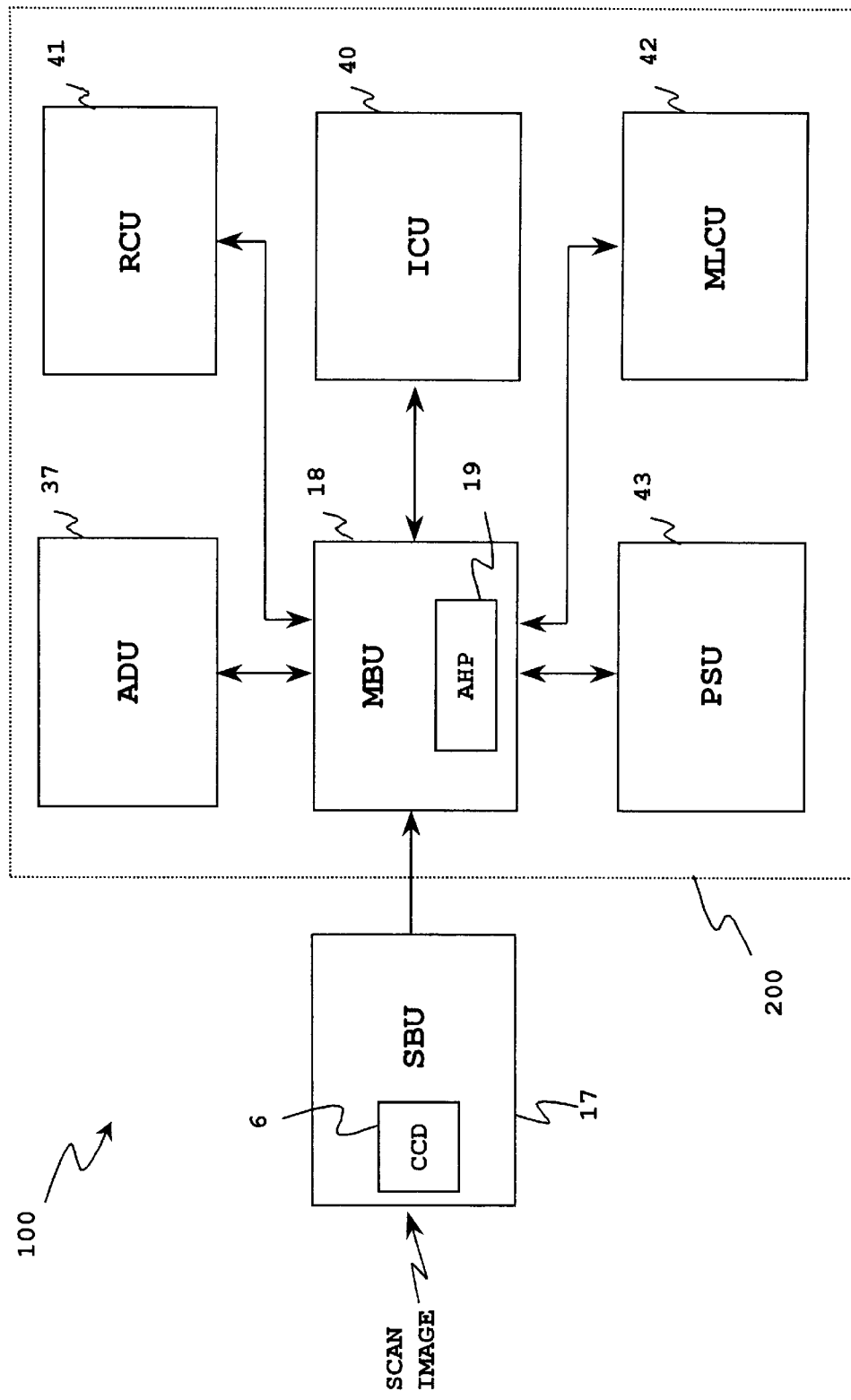
FIG. 2 is a block diagram of the image reading apparatus illustrated in FIG. 1.

Further, the image reading apparatus 100 of FIG. 1 includes an electrical control unit 200 which will be explained next with reference to FIG. 2. The electrical control unit 200 of FIG. 2 includes a mother board unit (MBU) 18 which includes an analog data handling peripheral (AHP) 19. The electrical control unit 200 further includes an ADF driving unit (ADU) 37, an image data control unit (ICU) 40, a reverse side control unit (RCU) 41, a motor/lamp control unit (MLCU) 42, and a power supply unit (PSU) 43, all connected to the MBU 18.

The MBU 18 relays signals between the connected units and receives an image signal generated by the CCD 6 through the sensor board unit (SBU 17). The AHP 19 of the MBU 18 performs signal processing so that the received image signal is corrected to a signal having a predetermined amplitude. After the amplitude correction, the image signal is converted into a digital signal by an A/D converter (not shown) included in the MBU 18.

The ADU 37 supplies power to various moving and/or functional elements including motors, such as the second motor (not shown) and the third motor 16, solenoids (not shown), sensors (not shown), switches (not shown), and so forth. The ICU 40 receives the digital image signal from the MBU 18 and controls the digital image signal, by performing various corrections and adjustments and a conversion into a video signal (image data), storing the image data in a memory, changing the image data in accordance with instructions, and outputting the image data to an external system such as a PC (personal computer), an image forming apparatus including, e.g., a printer, and so forth.

The RCU 41 (which is an optional element) is selectable by users and controls a reverse side reading operation during a duplex reading mode in which the image reading apparatus 100 simultaneously reads both sides of an original sheet. The RCU 41 includes a lamp (not shown) similar to the lamp 3 and a sensor board unit (not shown) similar to the SBU 17 for a reverse side reading operation.

The MLCU 42 supplies power to various moving and functional elements of the image reading apparatus 100, including the lamp 3, the motor 7, indicators (not shown), and switches (not shown). The PSU 43 supplies various stable power for the entire operation of the image reading apparatus 100.

The electrical control unit 200 for the image reading apparatus 100 is thereby configured as described above.

Figure 3:
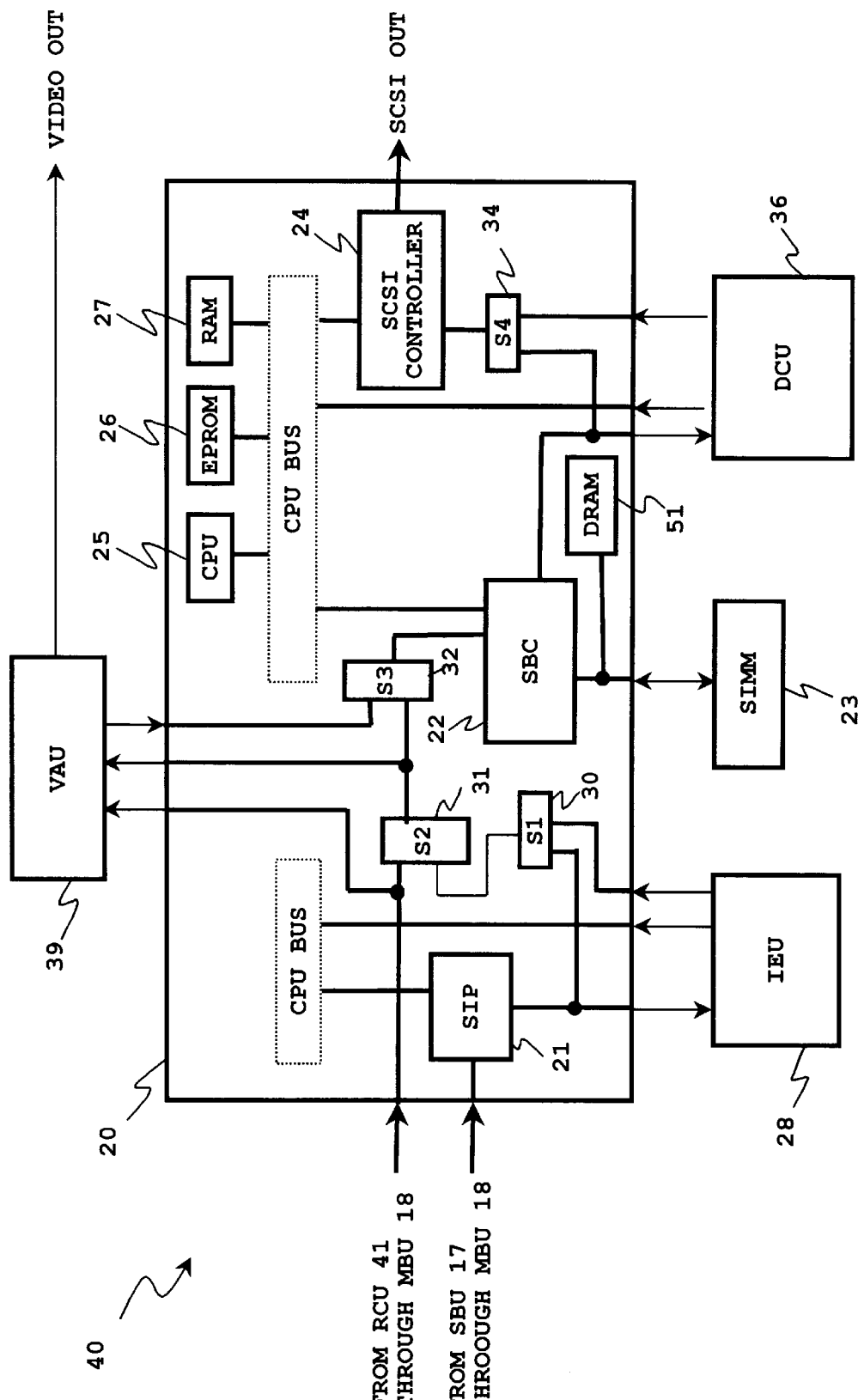
FIG. 3 is a block diagram of an image data control unit of the image reading apparatus illustrated in FIG. 1.

Next, an exemplary circuit of the ICU 40 is explained with reference to FIG. 3. The ICU 40 of FIG. 3 includes a scanner control unit (SCU) 20, a signal inline memory module (SIMM) 23, an imaging enhance unit (IEU) 28, a data compression unit (DCU) 36, and a video adapter unit (VAU) 39, wherein the SCU 20 has connections to the SIMM 23, the IEU 28, the DCU 36, and the VAU 39.

The SCU 20 of the ICU 40 includes a scanner imaging peripheral (SIP) 21, a scan buffer controller (SBC) 22, a SCSI (small computer systems interface) controller 24, a CPU (central processing unit) 25, an EPROM (erasable programmable read-only memory) 26, a RAM (random access memory) 27, first through fourth selectors 30, 31, 32, and 34, and a DRAM (dynamic random access memory) 51. The selectors 30, 31, 32, and 34 are also referred to as S1–S4, respectively. In the SCU 20, the digital image signal from the MBU 18 is input to the SIP 21 and is subject to various signal corrections and adjustments including a shading correction, a gamma correction, a MTF (modulation transfer function) correction, a binary conversion, and so forth, so as to become an output video signal (image data) with a page synchronizing signal, a line synchronizing signal, and a clock signal. The video signal (image data) output from the SIP 21 is sent to the IEU 28, is subjected to appropriate image processing, and is then sent to the SCU 20 back again.

The returned video signal is input into the first selector 30 of the SCU 20, which also receives the video signal from the SIP 21 and which is capable of selecting either one of these signals; i.e., the video signal with or without being subjected to the appropriate signal processing in the IEU 28. The output signal from the first selector 30 is sent to the second selector 31 which also receives an output from the RCU 41 and which is capable of selecting either one of these signals; i.e., the image data from the front or rear side of the original sheet. The RCU 41 controls the image reading operation for the rear side during the duplex image reading operation, as described above. Operations of the RCU 41 are controlled by the CPU 25 of the SCU 20 using a serial communications procedure, and resultant image data read from the rear side by the RCU 41 is formed as a video signal so as to be sent to the SCU 20, through the MBU 18.

The output from the second selector 31 is sent to the third selector 32 and also to the VAU 39 which can be connected to an external system such as a PC (personal computer), an image forming apparatus including, e.g., a printer, and so forth, for example. The third selector 32 also receives a video signal from the VAU 39 and sends an output video signal to the SBC 22 which is capable of selecting either one of the video signal from the VAU 39 and from the second selector 31, and which is capable of controlling an image memory composed of the DRAM 51 and the optional SIMM 23. The image video signal from the SIP 21 is thus sent to and stored in the image memory.

The video signal output from the SBC 22 is sent to the fourth selector 34 and the DCU 36 which compresses the image data and sends the compressed data back to the SCU 20. The compressed image data is also sent to the fourth selector 34 which is capable of selecting either one of the normal image data and the compressed image data. An output signal from the fourth selector 34 is sent to the SCSI controller 24 which performs communications of image data with external systems such as PCs (not shown).

The CPU 25 on the SCU 20 controls the SCSI controller 24 to perform communications with an external system and also controls timings for driving the first motor 7, the second motor (not shown), and the third motor 16.

In the way as described above, the image video signal is processed in the ICU 40.

Figure 4:
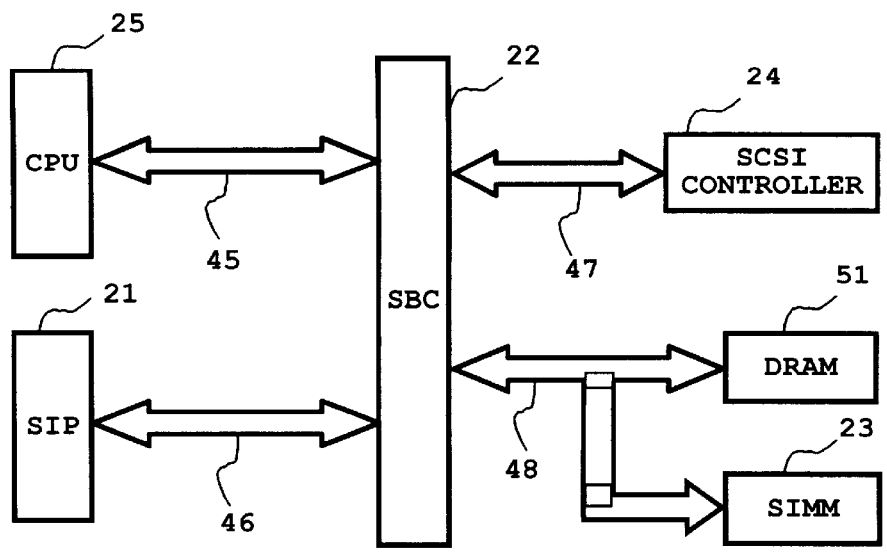
FIG. 4 is a block diagram explaining various interfaces accessing a scan buffer controller of the image data control unit of FIG. 3.
Figure 5:
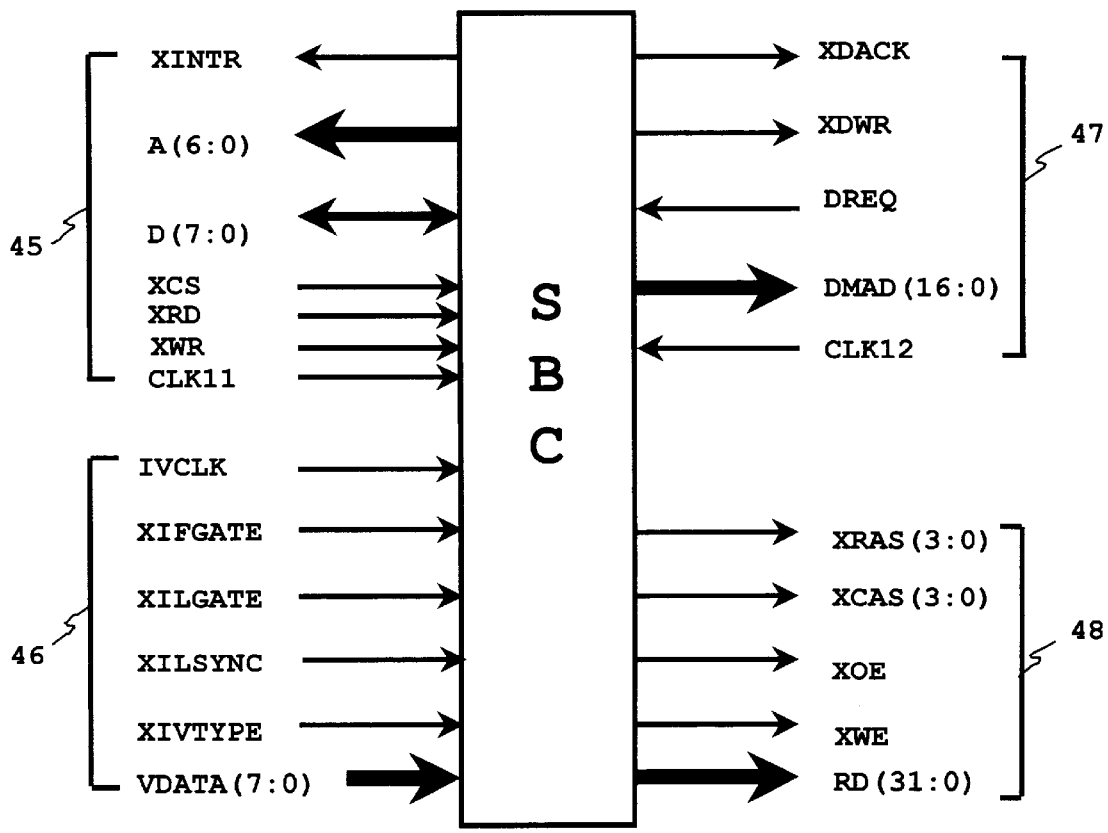
FIG. 5 is an illustration indicating examples of signals used for the interfaces shown in FIG. 4.

Next, details of the SBC 22 are explained with reference to FIGS. 4–6. As illustrated in FIG. 4, the SBC 22 has a CPU (central processing unit) interface 45 for exchanging data and control signals with the CPU 25, a video interface 46 for receiving image data from the SIP 21, a DMA (direct memory access) interface 47 for transmitting image data to the SCSI controller 24, and a DRAM (direct random access memory) interface 48 for exchanging various data with the DRAM 51 and the SIMM 23. FIG. 5 indicates exemplary signals for the above-mentioned communications executed through these interfaces 45–48.

Figure 6:
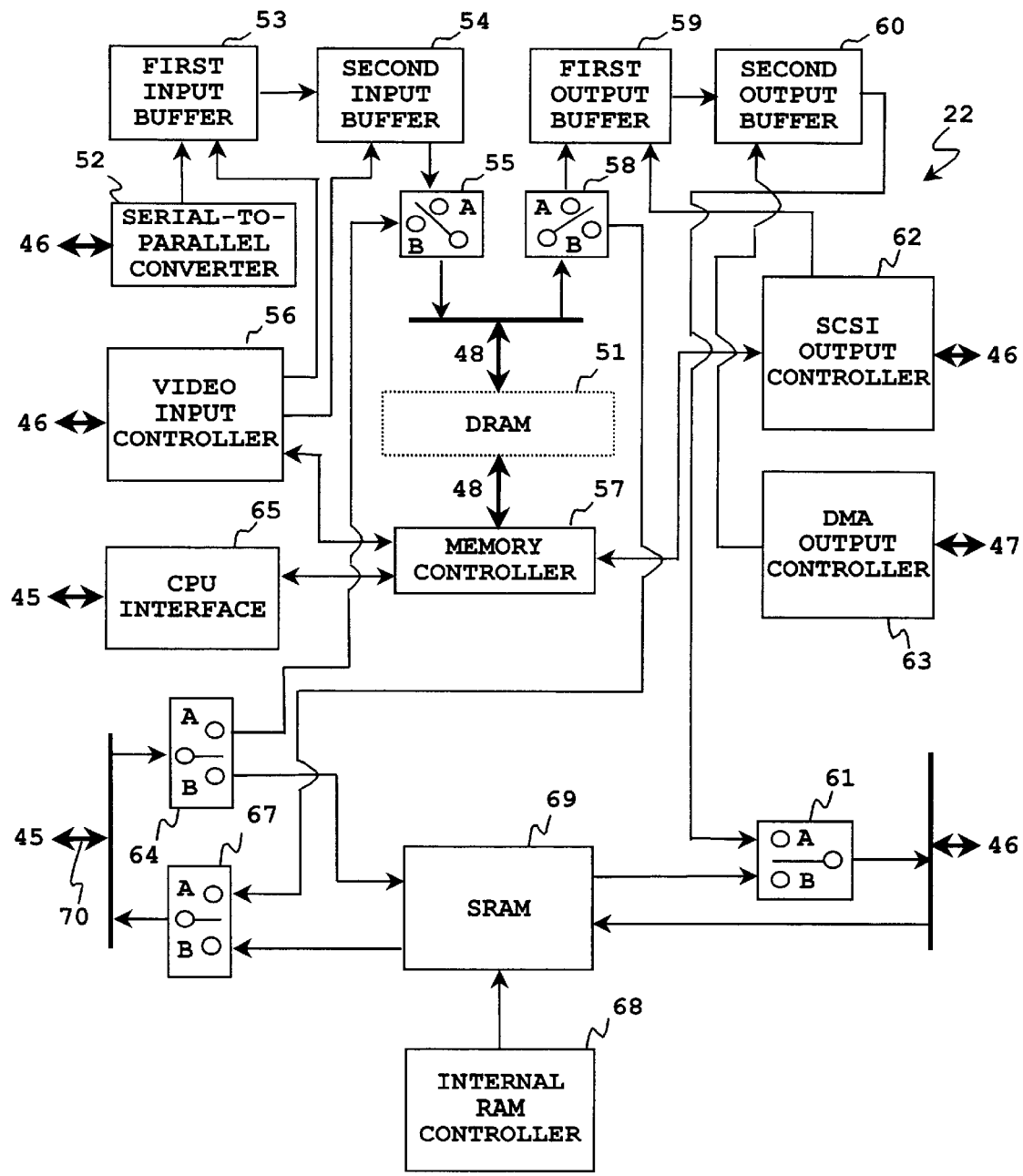
FIG. 6 is a block diagram of a scan buffer controller of the image data control unit shown in FIG. 3.

As illustrated in FIG. 6, the SBC 22 has various circuits for writing image data from the SIP 21 of SCU 20, as a data control unit, into the DRAM 51 including a serial-to-parallel converter 52, first and second input buffers 53 and 54, a first input selector 55, a video input controller 56, and a memory controller 57. Further, the SBC 22 has various circuits for reading image data stored in the DRAM 51 including a first output selector 58, first and second output buffers 59 and 60, a second output selector 61, a video SCSI output controller 62, and a DMA (direct memory access) output controller 63. Further, the SBC 22 has various circuits for writing image data from the CPU 25, as a further data control unit, into the DRAM 51 including a second input selector 64, the input selector 55, a CPU (central processing unit) interface 65, and the memory controller 57. Further, the SBC 22 has various circuits for reading image data stored in the DRAM 51 including the first output selector 58, a third output selector 67, the CPU interface 65, and the memory controller 57.

In the thus-configured SBC 22, image data from the SIP 21 and image data from the CPU 25 can selectively be written into the DRAM 51 by switching the first input selector 55 between contacts A and B thereof. Also, reading the image data stored in the DRAM 51 by the SCSI controller 24 and by the CPU 25 can selectively can be performed by switching of the first output selector 58.

In addition, as illustrated in FIG. 6, the SBC 22 has a SRAM (static ransom access memory) 69 for storing various control commands and an internal RAM (random access memory) 68 for controlling the SRAM 69.

The above-described SBC 22 writes image data into the DRAM 51 in the following manner. First, the first input selector 55 is switched to its contact A. Serial 8-bit image data, for example, to be written is then input into the serial-to-parallel converter 52 and is converted therewith into parallel 8-bit image data, for example. The parallel 8-bit image data is then latched by four 8-bit latches of the first input buffer 53 under control of the video input controller 56. The image data latched in the first input buffer 53 is then transferred to the second input buffer 54 and is latched by four 8-bit latches thereof under the control of the video input controller 56. The video input controller 56 then sends a request for image data writing to the memory controller 57. Subsequently, the memory controller 57 writes a set of the 32-bit image data latched in the second input buffer 54 into the DRAM 51 at a designated address.

The above-described SBC 22 can also read image data stored in the DRAM 51 in the following manner. First, the first and second output selectors 58 and 61 are switched to their respective contacts A. Upon receiving a read data request from external of the SBC 22, the DMA output controller 63 transfers the request to the video SCSI output controller 62. The video SCSI output controller 62 then transfers the request to the memory controller 57. Subsequently, the memory controller 57 starts to read image data from the DRAM 51 at a designated address, and the read image data is then latched in a parallel form in the first output buffer 59. The video output controller 62 then notifies the DMA output controller 63 that the image data is latched in the first output buffer 59, and the DMA output controller 63 then transfers the image data latched in the first output buffer 59 to the second output buffer 60. After the image data transfer, the DMA output controller 63 further transfers the image data stored in the second output buffer 60 external to the SBC 22 through the second output selector 61, e.g. block by block and in sequence.

Further, the above-described SBC 22 reads and writes image data for the CPU 25 relative to the DRAM 51 in the following manner. When the memory controller 57 receives a write data request from the CPU 25 through the CPU interface 65, the second input buffer 64 is switched to its contact A and the first input selector 55 is switched to its contact B. Then, the memory controller 57 starts to write data sent through a CPU bus-line 70 into the DRAM 51 at a designated address. When the memory controller 57 receives a read data request from the CPU 25 through the CPU interface 65, the first output buffer 58 is switched to its contact B and the third output selector 67 is switched to its contact A. Then, the memory controller 57 starts to transfer data from the DRAM 51 at a designated address to the CPU bus-line 70.

Thus, with the operations noted above the SBC 22 can perform read and write operations for a video signal and for the CPU 25, relative to the DRAM 51 which stores image data.

Figure 7:
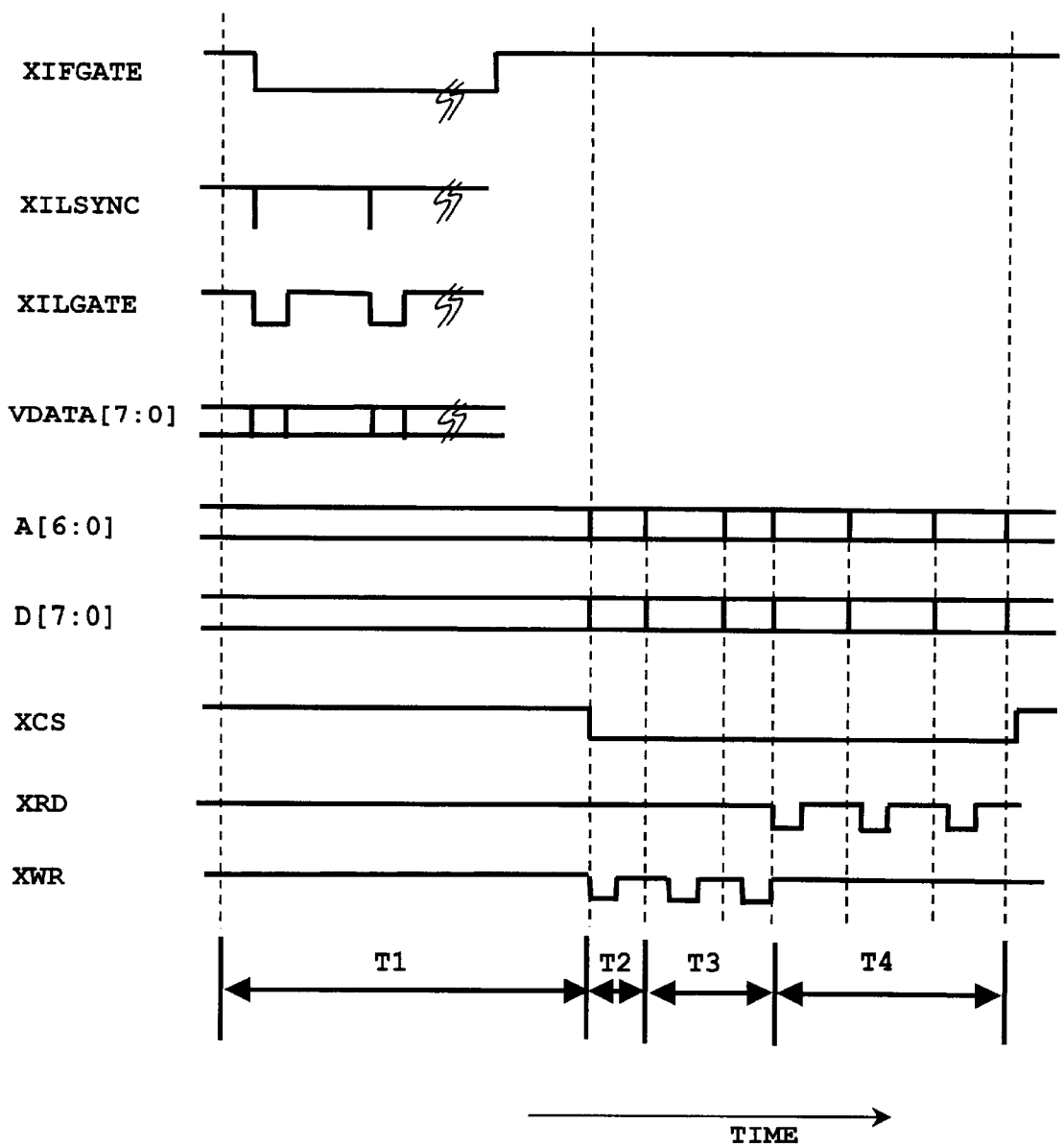
FIG. 7 is a time chart showing timings of video data input and a data control unit, e.g. CPU, read/write under a control of the scan buffer controller of FIG. 6.

Next, an example of sequential access timings when the CPU 25 uses the SBC 22 to read and write image data relative to the DRAM 51 is explained with reference to FIG. 7. In FIG. 7, an XIFGATE signal is a frame gate and is low (for example logical 0) for a time period of a write operation for writing data of a full page. An XILSYNC signal is a timing signal for an XILGATE, a line gate, and data of a line can be input when XILGATE is low (0). A VDATA[7:0] signal represents 8-bit video data to be written line by line when XILGATE is low (0). A time T1 is referred to as a time for the SIP 21 to input video data in the above-described sequence of the signals, for example.

An A[6:0] signal and a D[7:0] signal represent 7-bit address data and 8-bit image data, respectively, sent from the CPU 25. An XCS signal is a chip selection signal for selecting the CPU interface 65 in order to allow the CPU 25 to access the DRAM 51 using a read gate, a XRD, and a write gate, a XWR. Accordingly, times T2, T3, and T4 are referred to as times for the CPU 25 to set the selectors, to write data, and to read data, respectively, for example.

In the example indicated in FIG. 7, the first input selector 55 is switched to its contact A and video data of a full page is written into the DRAM 51 in the time T1. Then, the CPU 25 sets the first input and output selectors 55 and 58 to their respective contacts B in the time T2. Then, the CPU 25 writes image data into the DRAM 51 in the time T3 and reads image data from the DRAM 51 in the time T4.

During the above-described operation, the second input selector 64 and the third output selector 67 are set to their respective contacts A.

By the thus-configured SBC 22, the image reading apparatus 100 can write video data (image data) into the DRAM 51 with the first input selector 55 set to its contact A and can simultaneously read image data from the DRAM 51 with the first output selector 58 set to its contact B. With this function, the image reading apparatus 100 is capable of checking the video data and writing arbitrary data relative to the read image data.

Figure 8:
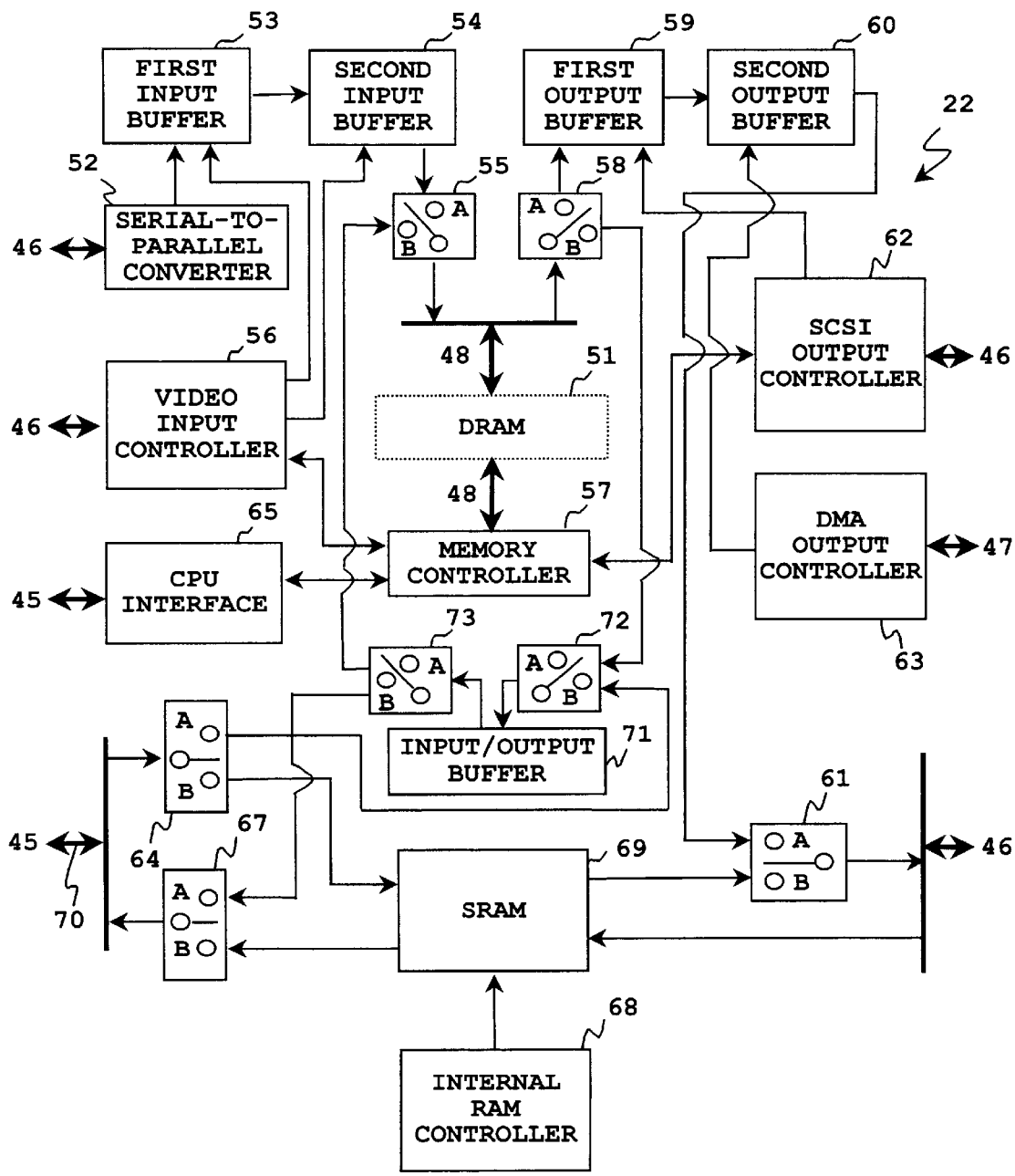
FIG. 8 is a block diagram of a modified version of the scan buffer controller of FIG. 6 of the image data control unit shown in FIG. 3.

Next, an exemplary modification made to the SBC 22 is explained with reference to FIG. 8. A modified version of the SBC 22 is referred to as a scan buffer controller (SBC) 22a. The SBC 22a of FIG. 8 is similar to that of FIG. 6, except that SBC 22a of FIG. 8 further utilizes an input/output buffer 71, and first and second input/output selectors 72 and 73. As illustrated in FIG. 8, in the SBC 22a, when the CPU 25 writes image data into the DRAM 51 the image data is stored into the input/output buffer 71, and when the CPU 25 reads image data from the DRAM 51 the read image data is stored into the input/output buffer 71. For this purpose, the first and second input/output selectors 72 and 73 are respectively disposed in front of and in back of the input/output buffer 71.

The CPU 25 writes image data into the DRAM 51 through the above-described SBC 22a in the following manner. First, the CPU 25 sets the first input/output selector 72 to its contact B and the second input/output selector 73 to its contact A and sends the image data to the input/output buffer 71. At this time, the second input selector 64 is set to its contact A. Then, the memory controller 57 checks if there is any incoming data from the SIP 21 and, only when there is no incoming data from the SIP 21, sets the first input selector 55 to its contact B. The memory controller 57 then writes the image data stored in the input/output buffer 71 into the DRAM 51 and, after data writing, sets the first input selector 55 back to its contact A.

Further, the CPU 25 reads image data from the DRAM 51 through the SBC 22a in the following manner. The CPU 25 sets the first input/output buffer 72 to its contact A and sends a data read request to the memory controller 57 through the CPU interface 65. Upon receiving the request, the memory controller 57 switches the first output selector 58 to its contact B in registration with the video SCSI output controller 62 and reads the image data from the DRAM 51 to write the data into the input/output buffer 71. Subsequently, the CPU 25 switches the second input/output selector 73 to its contact B and reads the image data stored in the input/output buffer 71. During this operation, the third output selector 67 remains set at its contact A.

Figure 9:
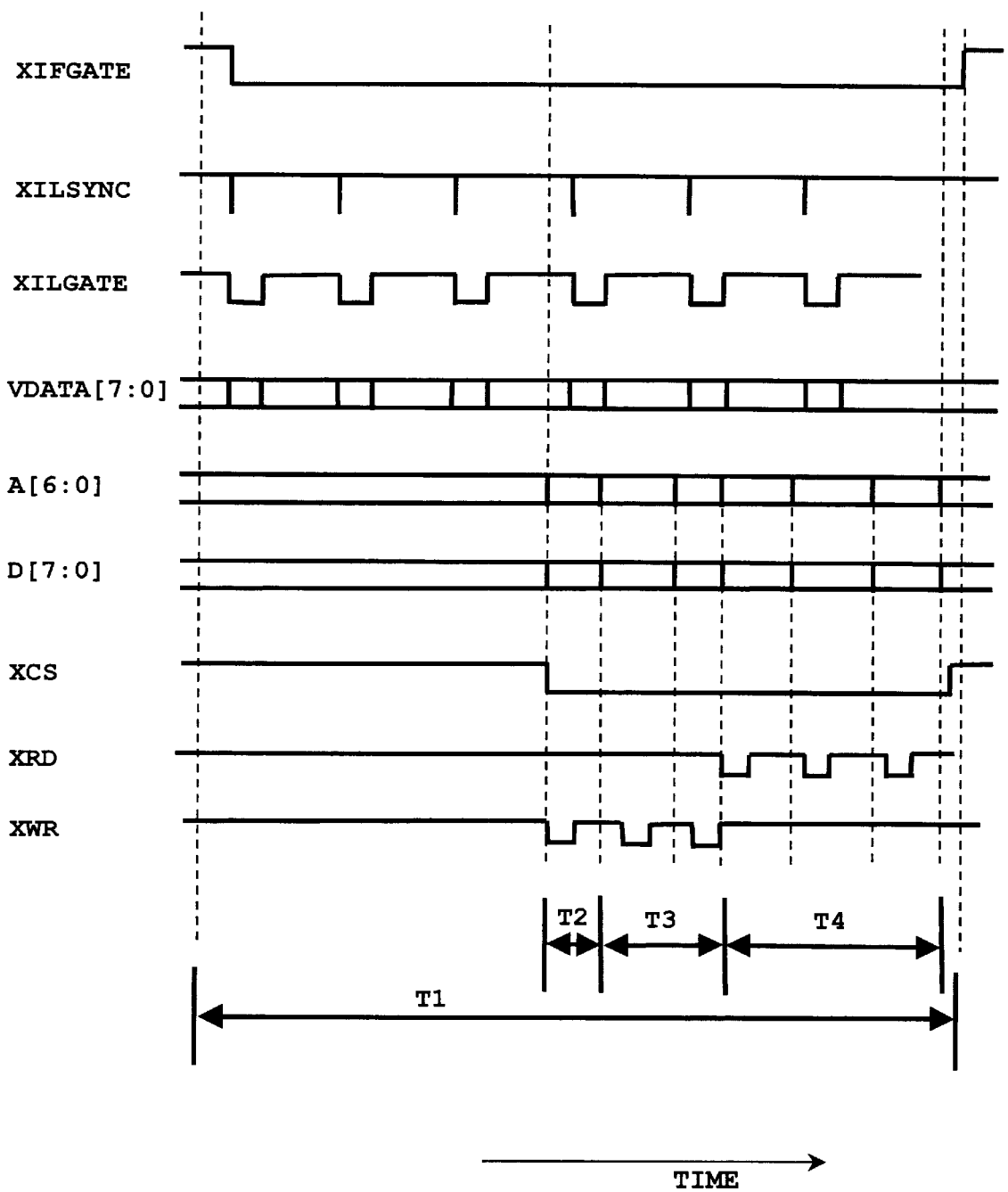
FIG. 9 is a time chart showing timings of video data input and a data control unit, e.g., CPU, read/write under a control of a modified version of a scan buffer controller.

Next, an example of sequential access timings when the CPU 25 uses the SBC 22a to read and write image data relative to the DRAM 51 is explained with reference to FIG. 9 which indicates signals similar to those of FIG. 7. As indicated in FIG. 9, the SBC 22a switches the first input selector 55 to its contact A and writes video data of a full page into the DRAM 51 during time T1. In this SBC 22a, the CPU 25 performs the operations of times T2–T4 in parallel to the above-described operations of time T1; that is, switching the first input and output selectors 55 and 58 to the respectively appropriate contact positions in time T2, and performing the data writing and reading operations relative to the DRAM 51 in times T3 and T4, respectively, are performed in parallel to time T1.

With this configuration, the SBC 22a allows the CPU 25 to access the DRAM 51 even during the time that the DRAM 51 is in a process of video data writing. Accordingly, a modified version of the image reading apparatus 100 includes the SBC 22a which is capable of performing high-speed data processing by real-time operations, such as an input data check, a data embedding like a stamp, and so forth.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network( of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

This application is based on Japanese patent application No. JPAP09-215874 filed in the Japanese Patent Office on Jul. 25, 1997, the entire contents of which are hereby incorporated by reference.

What is claimed is:

1. An image reading apparatus, comprising:

a memory;

a plurality of data controllers;

a serial-to-parallel converter converting serial image data from a first data controller of said plurality of data controllers into parallel image data;

an input buffer latching said parallel image data converted by said serial-to-parallel converter;

a first write mechanism writing a set of the parallel image data latched in said input buffer into said memory;

a first read mechanism reading said set of the parallel image data from said memory;

an output buffer latching said set of the parallel image data from said memory;

a data output mechanism outputting said set of the parallel image data from said output buffer;

a second write mechanism writing data from a second data controller of said plurality of data controllers into said memory, said second write mechanism being selectively used with said first write mechanism; and a second read mechanism reading said set of the parallel image data in said memory and transferring said read data to said second data source, said second read mechanism being selectively used with said first read mechanism, wherein said first data controller controls said first write and read mechanisms and said second data controller controls said second write and read mechanisms.

2. The image reading apparatus according to claim 1, wherein said second write mechanism includes a temporary input buffer for temporarily storing image data before writing said image data into said memory, and said second read mechanism includes a temporary output buffer for temporarily storing image data read from said memory.

3. The memory control apparatus according to claim 2, wherein said temporary input buffer and said temporary output buffer are combined into a common temporary input/output buffer which is selectively used by said second write mechanism and said second read mechanism.

4. An image reading apparatus, comprising:

memory means;

a plurality of data control means;

serial-to-parallel converting means for converting serial image data from a first data control means of said plurality of data control means into parallel image data;

input buffer latching means for latching said parallel image data converted by said serial-to-parallel converting means;

first writing means for writing a set of the parallel image data latched in said input buffer latching means into said memory means;

first reading means for reading said set of the parallel image data from said memory means;

output buffer latching means for latching said set of the parallel image data from said memory means;

data outputting means for outputting said set of the parallel image data from said output buffer latching means;

second writing means for writing data from a second data control means of said plurality of data control means into said memory means, said second writing means being selectively used with said first writing means; and second reading means for reading said set of the parallel image data in said memory means and transferring said data to said second data control means, said second reading means being selectively used with said first reading means, wherein said first data control means controls said first writing and reading means and said second data control means controls said second writing and reading means.

5. The memory control apparatus according to claim 4, wherein said second writing means includes a temporary input buffer means for temporarily storing image data before writing said image data into said memory means, and said second reading means includes a temporary output buffer means for temporarily storing image data read from said memory means.

6. The memory control apparatus according to claim 5, wherein said temporary input buffer means and said temporary output buffer means are combined into a common temporary input/output buffer means which is selectively used by said second writing and reading means.

7. A method for an image data memory control of an image reading apparatus, comprising the steps of:

providing a memory;

providing a plurality of data controllers;

converting serial image data from a first data controller of said plurality of data controllers into parallel image data;

latching said parallel image data into an input buffer;

first writing a set of the parallel image data in said input buffer into a memory;

first reading said set of the parallel image data from said memory;

latching said set of the parallel image data read from said memory into an output buffer;

outputting said set of the parallel image data in said output buffer;

second writing data from a second data controller of said plurality of data controllers into said memory, said step of second writing being selectively performed with said step of first writing;

second reading said set of the parallel image data in said memory, said step of second reading being selectively performed with said step of first reading; and transferring said set of the parallel image data to said second data controller, wherein said first data controller controls said first writing and reading steps and said second data controller controls said second writing and reading steps.

8. The method according to claim 7, wherein said step of second writing includes a substep of storing image data into a temporary input buffer before said image data is written into said memory, and said step of second reading includes a substep of storing image data read from said memory into a temporary output buffer.

9. The method according to claim 8, wherein said temporary input buffer and said temporary output buffer are combined into a common temporary input/output buffer which is selectively used by said second writing and reading steps.

10. An image data memory control apparatus, comprising:

a serial-to-parallel converter converting serial image data from a first data source into parallel image data;

an input buffer latching said parallel image data converted by said serial-to-parallel converter;

a first write mechanism writing a set of the parallel image data in said input buffer into a memory;

a first read mechanism reading said set of the parallel image data from said memory;

an output buffer latching said set of the parallel image data read from said memory;

a data output mechanism outputting said set of the parallel image data in said output buffer;

a second write mechanism writing data from a second data source into said memory, said second write mechanism being selectively used with said first write mechanism; and a second read mechanism reading said set of the parallel image data from said memory and transferring said read data to said second data source, said second read mechanism being selectively used with said first read mechanism.

11. The image data memory control apparatus according to claim 10, wherein said second write mechanism includes a temporary input buffer for temporarily storing image data before writing said image data into said memory, and said second read mechanism includes a temporary output buffer for temporarily storing image data read from said memory.

12. The image data memory control apparatus according to claim 11, wherein said temporary input buffer and said temporary output buffer are combined into a common temporary input/output buffer which is selectively used by said second write and read mechanisms.

13. An image data memory control apparatus, comprising:

serial-to-parallel converting means for converting serial image data from a first data source into parallel image data;

input buffer latching means for latching said parallel image data converted by said serial-to-parallel converting means;

first writing means for writing a set of the parallel image data in said input buffer into a memory;

first reading means for reading said set of the parallel image data from said memory;

output buffer latching means for latching said set of the parallel image data read from said memory;

data outputting means for outputting said set of the parallel image data in said output buffer;

second writing means for writing data from a second data source into said memory, said second writing means being selectively used with said first writing means; and second reading means for reading said set of the parallel image data from said memory and transferring said read data to said second data source, said second reading mechanism being selectively used with said first reading means.

14. The image data memory control apparatus according to claim 13, wherein said second writing means includes a temporary input buffer means for temporarily storing image data before writing said image data into said memory, and said second reading means includes a temporary output buffer means for temporarily storing image data read from said memory.

15. The image data memory control apparatus according to claim 14, wherein said temporary input buffer means and said temporary output buffer means are combined into a common temporary input/output buffer means which is selectively used by said second writing and reading means.

16. A method for an image data memory control, comprising the steps of:

converting serial image data from a first data source into parallel image data;

latching said parallel image data into an input buffer;

first writing a set of the parallel image data in said input buffer into a memory;

first reading said set of the parallel image data from said memory;

latching said set of the parallel image data read from said memory into an output buffer;

outputting said set of the parallel image data in said output buffer;

second writing data from a second data source into said memory, said step of second writing being selectively performed with said step of first writing;

second reading said set of the parallel image data from said memory, said step of second reading being selectively performed with said step of first reading step; and transferring said set of the read parallel image data to said second data source.

17. The method according to claim 16, wherein said step of second writing includes a substep of temporarily storing image data into a temporary input buffer before said image data is written into said memory, and said step of second reading includes a substep of temporarily storing image data from said memory into a temporary output buffer.

18. The method according to claim 17, wherein said temporary input buffer and said temporary output buffer are combined into a common temporary input/output buffer which is selectively used by said second writing and reading steps.

* * * * *

UNITED STATES PATENT AND TRADEMARK OFFICE
CERTIFICATE OF CORRECTION

PATENT NO. : 6,381,040 B1
DATED : April 30, 2002
INVENTOR(S) : Takahashi

It is certified that error appears in the above-identified patent and that said Letters Patent is hereby corrected as shown below:

<u>Title page, Item [54] and Column 1, lines 1-4,</u>
Should read as follows: -- [54]   IMAGE READING APPARATUS HAVING A PLURALITY OF READ/WRITE ACCESSES RELATIVE TO AN IMAGE DATA MEMORY AND A METHOD THEREFOR --

Signed and Sealed this

Twenty-fourth Day of September, 2002

*Attest:*

JAMES E. ROGAN
*Attesting Officer*            *Director of the United States Patent and Trademark Office*